US 8,425,961 B2

(12) United States Patent
Turek

(10) Patent No.: US 8,425,961 B2
(45) Date of Patent: Apr. 23, 2013

(54) METHOD, APPARATUS AND MOLD FOR PRODUCING A CONFECTIONERY PRODUCT

(75) Inventor: Evan Joel Turek, Libertyville, IL (US)

(73) Assignee: Kraft Foods R&D, Inc., Deerfield, IL (US)

( * ) Notice: Subject to any disclaimer, the term of this patent is extended or adjusted under 35 U.S.C. 154(b) by 94 days.

(21) Appl. No.: 12/725,152

(22) Filed: Mar. 16, 2010

(65) Prior Publication Data

US 2010/0239725 A1    Sep. 23, 2010

Related U.S. Application Data

(60) Provisional application No. 61/162,441, filed on Mar. 23, 2009.

(30) Foreign Application Priority Data

Mar. 19, 2009    (EP) ..................... 09155591

(51) Int. Cl.
*A23G 1/20*    (2006.01)
(52) U.S. Cl.
USPC ........... 426/282; 426/660; 426/631; 426/514; 426/515; 426/520; 99/451; 99/DIG. 14; 219/620; 219/633; 219/642; 219/645; 425/174.8 R; 264/487
(58) Field of Classification Search .......... 426/241–247, 426/282, 660, 631, 512, 514, 515, 520, 524; 219/600, 620, 633, 642, 645; 425/174.8 R, 425/508, 292, 218; 264/405, 486
See application file for complete search history.

(56) References Cited

U.S. PATENT DOCUMENTS 1,467,351 A * 9/1923 Blunt ............................ 426/280
1,518,737 A * 12/1924 Griffith ........................ 426/138
(Continued)

FOREIGN PATENT DOCUMENTS

DE    3139323 A1    6/1982
DE    3519052 A1    1/1986
(Continued)

OTHER PUBLICATIONS

Chen, Shia-Chung, et al.; "Dynamic Mold Surface Temperature Control Using Induction Heating and its Effects on the Surface Appearance of Weld Line"; Journal of Applied Polymer Science, vol. 101, 1174-1180 (2006); 7 pgs.
(Continued)

*Primary Examiner* — Drew E Becker
(74) *Attorney, Agent, or Firm* — Fitch, Even, Tabin & Flannery LLP

(57) ABSTRACT

A method for producing a confectionery product from at least two pieces with at least one interface between the two pieces and including meltable material at least in parts of the interface, comprising the step of heating the interface during or after the two pieces have been brought into contact with each other. An apparatus for producing a confectionery product from two or more pieces comprising at least one heater in or downstream of a station where at least two pieces of the confectionery product are brought into contact with each other. A mold for the production of a confectionery product having at least two pieces has at least one component or portion heatable by induction heating. A heatable component, preferably a ferromagnetic component provided in the vicinity of a confectionery product, is used for partially heating the confectionery product, preferably by induction heating.

12 Claims, 2 Drawing Sheets

U.S. PATENT DOCUMENTS

| | | | | |
|---|---|---|---|---|
| 2,278,466 | A * | 4/1942 | Musher | 426/89 |
| 2,461,399 | A * | 2/1949 | Strausser | 426/103 |
| 2,642,009 | A * | 6/1953 | Orfitelli | 425/218 |
| 2,682,471 | A * | 6/1954 | Alther | 426/102 |
| 3,556,022 | A * | 1/1971 | Westin | 426/392 |
| 3,666,388 | A * | 5/1972 | Oberwelland | 425/261 |
| 3,961,089 | A | 6/1976 | Dogliotti | |
| 3,962,473 | A | 6/1976 | Lilov | |
| 4,020,310 | A | 4/1977 | Souder, Jr. et al. | |
| 4,378,892 | A | 4/1983 | Ochs et al. | |
| 4,430,351 | A * | 2/1984 | Cillario | 426/103 |
| 4,707,213 | A | 11/1987 | Mohr et al. | |
| 4,907,502 | A * | 3/1990 | Snyder, Jr. | 99/455 |
| 5,025,123 | A * | 6/1991 | Pfaffmann et al. | 219/604 |
| 5,516,540 | A * | 5/1996 | Cathenaut | 426/249 |
| 5,705,217 | A * | 1/1998 | Aasted | 426/512 |
| 5,786,643 | A | 7/1998 | Wyatt et al. | |
| 5,919,387 | A * | 7/1999 | Buckley et al. | 219/633 |
| 6,156,359 | A | 12/2000 | Segal | |
| 6,284,164 | B1 | 9/2001 | Weiss | 264/8 |
| 6,800,312 | B1 * | 10/2004 | Biggs | 426/103 |
| 7,064,307 | B2 * | 6/2006 | Harano et al. | 219/725 |
| 2006/0240175 | A1 * | 10/2006 | Weiss et al. | 426/660 |
| 2008/0213436 | A1 * | 9/2008 | Mansuino | 426/103 |
| 2009/0081347 | A1 * | 3/2009 | Gambino | 426/523 |
| 2009/0320694 | A1 * | 12/2009 | Parsons | 99/373 |

FOREIGN PATENT DOCUMENTS

| | | |
|---|---|---|
| DE | 3444060 | 7/1986 |
| DE | 4213296 A1 | 10/1993 |
| DE | 4322414 C1 | 8/1994 |
| DE | 69101272 T2 | 9/1994 |
| DE | 4421706 A1 | 11/1994 |
| DE | 69306427 T2 | 4/1997 |
| DE | 69309036 T2 | 6/1997 |
| DE | 19935385 A1 | 11/2000 |
| DE | 20105402 U1 | 7/2001 |
| DE | 29522295 U1 | 7/2001 |
| DE | 102005062893 B3 | 4/2007 |
| EP | 0131918 | 1/1985 |
| EP | 0494384 | 7/1992 |
| EP | 0647410 A1 | 4/1995 |
| EP | 0770332 A1 | 5/1997 |
| EP | 0614614 B1 | 7/1997 |
| EP | 0890516 A1 | 1/1999 |
| EP | 1000549 A2 | 5/2000 |
| EP | 1106074 A3 | 6/2001 |
| EP | 1172038 B1 | 1/2002 |
| EP | 1185474 A2 | 3/2002 |
| EP | 1056351 B1 | 4/2003 |
| EP | 1118269 B1 | 9/2003 |
| EP | 0931461 B1 | 3/2004 |
| EP | 1400175 A1 | 3/2004 |
| EP | 1673979 A1 | 6/2006 |
| EP | 1803356 A1 | 7/2007 |
| EP | 1952697 A2 | 8/2008 |
| GB | 347449 | 4/1931 |
| GB | 934263 | 8/1963 |
| GB | 1232646 | 5/1971 |
| GB | 1290359 | 9/1972 |
| GB | 2099276 A | 12/1982 |
| JP | 2004196596 A | 7/1994 |
| JP | 2000058251 A | 2/2000 |
| RU | 2084165 | 7/1997 |
| RU | 69377 | 12/2007 |
| WO | 9819557 A1 | 5/1998 |
| WO | 9830109 A1 | 7/1998 |
| WO | 9841105 A1 | 9/1998 |
| WO | 0219835 A1 | 3/2002 |
| WO | 2007026195 | 3/2007 |

OTHER PUBLICATIONS

Anonymous; Abstract, "Induction Heating System Promises Film Coil Coating for Small User"; Source: Steel Times, v. 215, n. 7, Jul. 1987; Journal Announcement 8711; 1 pg.

Anonymous; Abstract, "Heat Treating-Proceedings of the 23rd ASM Heat Treating Society Conference"; Source: ASM Proceedings: Heat Treating—Proceedings of the 23rd ASM Heat Treating Society Conference, 2006, Pittsburgh, PA; E.I. Conference No. 68720; 1 pg.

Behringer, H.; Abstract, "Joining of Thermoplastics by Induction Heating"; Source: Kunststoffe, v. 53, No. 11, Nov. 1963; Munich, West Germany; 1 pg.

Berardi, M.P.; Abstract, "Weld Tubing With Magnetic Shockwaves and Induction Heating"; Source: Welding Design and Fabrication, v. 42, No. 9, Sep. 1969; Journal Announcement 70X0; 1 pg.

Buser, J.E., et al.; Abstract, "Strength Analysis of the Induction Spot and Full Bonding Processes"; Source: SAE Technical Paper Series, SAE, Warrendale, PA, 1990; Detroit, MI Feb. 26, 1990; E.I. Conference No. 13111; 1 pg.

Wedgewood, A.R., et al.; Abstract, "Induction Welding of Thermoset Composite Adherends Using Thermoplastic Interlayers and Susceptors"; Source: Technology Transfer in a Global Community International SAMPE Technical Conference, v. 28, 1996, SAMPLE, Covina, CA; Seattle, WA, Nov. 4, 1996-Nov. 7, 1996; E.I. Conference No. 46351; 1 pg.

Chen, S.C., et al.; Abstract, "Dynamic Mold Surface Temperature Control Using Induction Heating and its Effects on the Surface Appearance of Weld Line", Source: Journal of Applied Polymer Science v. 101, No. 2; Jul. 15, 2006; 1 pg.

Chen, S.C., et al.; Abstract, "Efficiencies of Various Mold Surface Temperature Controls and Their Effects on the Qualities of Injection Molded Parts"; Source: Annual Technical Conference—ANTEC, Conference Proceedings Society of Plastics Engineers Annual Technical Conference 2006, ANTEC 2006—Conference Proceedings v. 3 2006, Charlotte, NC; May 7-May 11, 2006; E.I. Conference No. 67684; 1 pg.

Chen, S.C.,; et al.; Abstract "Variable Mold Temperature on the Part Qualities of Injection Molded Parts", Source: Annual Technical Conference—ANTEC, Conference Proceedings Society of Plastics Engineers Annual Technical Conference 2005, ANTEC 2005—Conference Proceedings v. 2, 2005; Boston, MA, May 1-May 5, 2005; E.I. Conference No. 66865; 1 pg.

Chookazian, S.M.; Abstract, "Emabond Process for Thermoplastic Assembly"; Source: Technical Paper—Society of Manufacturing Engineers, 1999; Troy, MI, E.I. Conference No. 55857; 1 pg.

European Search Opinion for EP09155591.2 dated Oct. 2, 2009; 2 pages.

European Search Report for EP09155591.2 dated Oct. 2, 2009; 2 pages.

Gosai, K., et al.; Abstract, "Getting to Grips with Sticky Polymer Surfaces"; Source: Materials World, v. 6, No. 9, Sep. 1998; Institute of Materials, London, UK; 1 pg.

Grelle, Peter F. et al.; Abstract, "What's New in Plastics Injection Molding Processes for Automotive Applications: An Update"; Source: New Plastics Applications for the Automotive Industry SAE Special Publications, v. 1253, 1997; SAE Warrendale, PA; Detroit, MI; E.I. Conference No. 46154; 1 pg.

Leatherman, A.; Abstract, "Induction Bonding Finds a Niche in an Evolving Plastics Industry"; Source: Plastics Engineering v. 37, No. 4, Apr. 1981; Journal Announcement 8109; 1 pg.

Leatherman, A.F.; Abstract, "Introduction to Induction Bonding of Reinforced Thermoplastics"; Source: Annual Technical Conference—Society of Plastics Engineers 41st; Society of Plastics Engineers, Brookfield Center, CT, 1983; Chicago, IL May 2, 1983; E.I. Conference No. 04289; 1 pg.

Miller, K. et al.; Abstract, "Development of an Inductively Heated Compression Molding Process and Die"; Source: Processing Annual Technical Conference—ANTEC, Conference Proceedings v. 1, 1997; Society of Plastics Engineers, Brookfield, CT; Toronto, Canada, Apr. 27, 1997-May 2, 1997; E.I. Conference No. 46511; 1 pg.

Anonymous; Abstract, "Plastic to Plastic Bonding by Induction Heating Allows Fast Low Cost Component Assembly: New Cost Effective Process"; Source: Packag. Innovation; vol. 7, No. 7, Apr. 2003; Journal Announcement 0307; 1 pg.

Hinzpeter, U.; Abstract, "Inductive Heating of Injection Molds"; Source: Kunststoffe Internaional; 98, No. 1, 2008; Journal Announcement 200803; 1 pg.

Velthuis, R., et al.,; Abstract, "Lightweight Structure Made of Metal and Fiber-Reinforced Polymers"; Source: Kunstatoffe International; 97, No. 11, 2007; Journal Announcement 200803; 1 pg.

Chen, S.C., et al.,; Abstract, "Efficiencies of Various Mold Surface Temperature Controls and Their Effects on the Qualities of Injection Molded Parts"; Conference Proceedings: ANTEC 2006. Proceedings of the 64th SPE Annual conference, Charlotte, NC, May 7-11, 2006; Source: Brookfield, CT, SPE 2006; Journal Announcement 200702; 1 pg.

Chen, S.C., et al.,; Abstract, "Dynamic Mold Surface Temperature Control Using Induction and Heater Heating Combined with Coolant Cooling"; Source: International Polymer Processing, 21, No. 5, Nov. 2006; Journal Article; 1 pg.

Lohse, H., et al.,; Abstract, "Joining of Plastics by Adhesive Bonding in Automotive Engineering"; Conference Proceedings: Joining Plastics, 2006: Second International Conference on Joining Plastics. Proceedings of a conference held London, Apr. 25-26, 2006; Source: Shawbury, Rapra Technology Ltd., 2006, Paper 2; Journal Announcement 200608; 1 pg.

Maier, C.; Abstract, "Introducing Induction Welding"; Source: Plastics and Rubber Weekly, Dec. 9, 2005; Journal Announcement: 200602; 1 pg.

Chen, S.C., et al.,; Abstract, "Variable Mold Temperature on the Part Qualities of Injection Molded Parts"; Conference Proceedings: ANTEC 2005. Proceedings of the 63rd SPE Annual Conference, Boston, MA; May 1-5, 2005; Source: Brookfield, CT; SPE, 2005; Journal Announcement: 200601; 1 pg.

Pryweller, J.; Abstract, "Spreckelsen Megeough Sticks its Bottle Neck Out"; Source: Plastics News (USA); 13, No. 36, Nov. 5, 2001; Journal Announcement: 200201; 1 pg.

Wise, R.J., et al.,; Abstract, "Polymer-Coated Material Joining Technology for Manufacture and Repair of Dissimilar Material Structures"; Conference Proceedings: Joining and Repair of Plastics and Composites. Conference Proceedings Corporate Editor: Institution of Mechanical Engineers; Source: London, Mar. 16-17, 1999; Journal Announcement: 200003; 1 pg.

Hasenauer, J., et al.,; Abstract, "Design of Injection Moulded Parts. II."; Source: Revue Generale des Caoutchoucs et Plastiques; No. 778, Jun./Jul. 1999; Journal Announcement: 199911; 1 pg.

Anonymous; Abstract, "Composites Manufacturing to be Environmentally Friendly"; Source: Advanced Materials & Processes; 155, No. 6, Jun. 1999; Journal Announcement: 199910; 1 pg.

Chookazian, S.M.; Abstract, "Electromagnetic Welding of Thermoplastics and Specific Design Criteria with Emphasis on Polypropylene"; Conference Proceedings: ANTEC '94; Source: San Francisco, CA, May 1-5, 1994, vol. 1; Journal Announcement: 199506; 1 pg.

Tatjana, B., et al.,; Abstract, "High Speed Curing by Medium-Frequency Induction for Plastics Bonding"; Conference Proceedings: Euradh '92; Source: Kalsruhe, Sep. 21-24, 1992; Journal Announcement: 199411; 1 pg.

Anonymous; Abstract, "Joining Dissimilar Materials by Induction Welding"; Source: Abington, c. 1992 pp. 2., 12 ins. Apr. 1, 1993; Journal Announcement: 199307; 1 pg.

Tight, T.; Abstract, Smart Heat Induction Fusion Joining of Polyethylene Gas Pipe: Results of GRI Sponsored Project; Conference Proceedings: Plastics Pipes VIII.; Source: Eindhoven, Sep. 21-24, 1992, Paper E1/3; Journal Announcement: 199304; 1 pg.

Anonymous; Abstract, "Rapid-Cure Polyurethane Protects Pipeline Field Joints"; Source: Stockport, 1992, p. 4, 12 ins., Apr. 6, 1992; Journal Announcement: 199303; 1 pg.

Barrett, J.; Abstract, "Mechanical Fastening: The Inside Story"; Source: Eureka; 12, No. 1, Jan. 1992; Journal Announcement: 199206; 1 pg.

Anonymous; Abstract, "FRC '90 Fibre Reinforced Composites"; Proceedings of the 4th international conference held Liverpool, Mar. 27-29, 1990; Source: Bury St. Edmunds, Mechanical Engineering Publications ltd., 1990; Journal Announcement: 199106; 1 pg.

Kujawa-Penczek, B., et al.; Abstract, "Polyurethane Adhesives 1984-1988, Part 3"; Source: Adhasion; 33, No. 11, Nov. 1989; Journal Announcement: 199009; 1 pg.

Anonymous; Abstract, "New Adhesives"; Source: Composities Plastiques Renforces Fibres de Verre Textile; 29, No. 4, Jul./Aug. 1989; Journal Announcement: 199008; 1 pg.

Anonymous; Abstract, "Pur Elastomer Keeps the Oil Flowing"; Source: Modern Plastics International; 19, No. 11, Nov. 1989; Journal Announcement: 199003; 1 pg.

Corbet, D.C.; Abstract, "Repair of Composites—An Overview"; Conference Proceedings: Bonding and Repair of composites; Source: Birmingham, Jul. 14, 1989; Journal Announcement: 198910; 1 pg.

Smoluk, G.R.; Abstract, "RF Updates Bonding of Plastics to Metal"; Source: Modern Plastics; 66, No. 4, Apr. 1989; Journal Announcement: 198908; 1 pg.

Anonymous; Abstract, "Productive Adhesive Technology for Automotive Engineering Applications"; Source: Society of Manufacturing Engineers; Dearborn, MI; 1988; 11 ins. 10 papers, Mar. 1, 1989; Journal Announcement: 198902; 1 pg.

Anonymous; Abstract, "Fusor 3201/3221 Induction Cure Epoxy Adhesive System"; Source Lord Corp., Industrial Adhesives Div., Erie, PA, 1986; pp. 8, 11 ins., Jan. 31, 1988; Journal Announcement: 198807; 1 pg.

Stein, B.A.; Abstract, "Rapid Adhesive Bonding and Field Repair of Aerospace Materials"; Conference Proceedings: Joining Technologies for the 1990; Source: Park Ridge, NJ, Noyes Publications, 1986; Journal Announcement: 198708; 1 pg.

Anonymous; Abstract, "Electromagnetic Welding"; Source: Macplas International; No. 11, Aug. 1986; Journal Announcement: 198705; 1 pg.

Anonymous; Abstract, "Welding for Plastics in Half Million Pounds Sterling Study"; Source: Engineer; 263, No. 6808; Sep. 18, 1986; Journal Announcement: 198612; 1 pg.

Frieser, A.; Abstract, "Finishing Techniques for Plastics Mouldings"; Source: Kunststoffe; 75, No. 9, Sep. 1985; Journal Announcement: 198603; 1 pg.

Anonymous; Abstract, "Electronicmagnetic Welding Process"; Source: Plastics and Rubber Weekly; No. 1106, Sep. 21, 1985; Journal Announcement: 198601; 1 pg.

Schwartz, S.S.; Abstract, "Plastics Materials and Processes"; Source: New York, Van Nostrand Reinhold Co. Inc., 1982; pp. xiv, 965, LS. 76, 12 ins., May 7, 1982; Journal Announcement: 198301; 1 pg.

Leatherman, A.F.; Abstract, "Induction Bonding of Plastics—Innovative Moulding and Extrusion Procedures Benefit Costs"; Source: SPE, Plastics—Creating Value Through Innovation, 39th ANTEC, Proceedings Boston, May 4-7, 1982; Journal Announcement: 198203; 1 pg.

Anonymous; Abstract, "Lightweight Air Cargo Container: Polyethylene Makes it Possible"; Source: Modern Plastics International; 11, No. 11, Nov. 1981; Journal Announcement: 198201; 1 pg.

* cited by examiner

METHOD, APPARATUS AND MOLD FOR PRODUCING A CONFECTIONERY PRODUCT

This application claims priority to European Patent Application Number 09155591.2, filed on Mar. 19, 2009. This application also claims the benefit of U.S. Provisional Application No. 61/162,441, filed Mar. 23, 2009.

TECHNICAL FIELD

This application relates to a method, apparatus and mold for producing a confectionery product.

BACKGROUND

In the field of confectionery, products are known which are made from chocolate or other lipid-based material and have a two-piece structure. For example, a shell can be produced first, filled with an appropriate filling such as fruit puree, liquor or caramel and closed with a lid. Other confectionery products, both filled and hollow, require two lipid-based moulded parts to be joined together around their perimeters.

U.S. Pat. No. 3,962,473 describes a method of making crust liqueurs, in which liquid filling is deposited in chocolate shells, which are closed by pouring liquid chocolate so as to produce a lid. As far as the bonding between the lid and the shell is concerned, the described method relies on the bond between the molten and, therefore, warm chocolate which is poured to produce the lid, and the edge of the shell, which is generally cold.

In this regard, DE 3444060 A1 describes a method and apparatus, in which a filled confectionery product is produced by forming a shell and filling same. Afterwards, the shell is passed through a heating station to heat the edges of the shell before the lid is applied by pouring molten chocolate on the shell and the filling. Experiments have shown that the bonding strength of products made in the aforementioned way is sometimes insufficient.

SUMMARY

There is provided a method, apparatus and mold for producing confectionery products from two (or more) pieces, through which the bonding between the two pieces, such as the shell and the lid, can be enhanced by applying heat directly, and exclusively to the joint between the two pieces.

In particular, there is provided a method for producing a confectionery product from at least two pieces with at least one interface, joint or seam between the two pieces. The two pieces can, for example, be two moulded shell halves (e.g. a hollow Easter egg); a filled or hollow shell and a lid where the lid is a flat "solid" piece of chocolate or other material; or a filled shell containing e.g. a fruit or caramel, with a sealing layer (e.g. chocolate) initially deposited as a liquid material. Further, the confectionery product to be produced by the novel method includes meltable material, such as dark or white chocolate or another lipid-based material in at least parts of the interface. The bonding strength between two pieces of confectionery product can be advantageously increased when the interface is heated during or after the pieces involved have been brought into contact with each other. Thus, in principle, the surfaces of the pieces which abut each other at the interface, are heated and melted to some extent, and held in that molten state for a sufficient time to allow the molten regions to merge, resulting in the formation of a strong bond when they are cooled afterwards.

As experiments have shown, this measure provides an improved bonding between the pieces from which the confectionery product is made, for example a shell and a lid of a filled praline, so that the filling will not leak, even if some mechanical stress is applied, for example during handling of the product. It has also been found that the above-described heating does not affect the temper of the chocolate. Without wishing to be constrained to any particular theory, it is believed that good bonding between two surfaces of chocolate requires adequate heat be applied to bring the chocolate on both surfaces to the molten state, and that sufficient time be allowed for these molten regions to comingle and form a homogenous layer prior to cooling. Thus, the method described herein is based on, but not limited to, the idea of heating the one or more interfaces between two or more pieces of a confectionery product, in other words the seam area(s) locally. In this respect, the seam area(s) may be located in a mold or form, which may comprise a heatable component, such as a metallic foil heatable by induction heating. However, the mold or form is not absolutely necessary. Rather, for example, a metallic foil or component may be present at the seam area(s) and heatable so as to realize the method described above. The mentioned foil, which may be applied as a tape around the perimeter of the surface to be heated, may be part of a decoration and may stay on the product until the product is consumed. It may also be a part of an outer wrapping, for example of cellophane, and may be separated from the product only when it is sold or consumed.

Currently, particularly good results have been achieved when performing the heating in the area of the interface by induction heating. This method can also be called indirect heating as the entire mold, in which the confectionery product is located, does not need to be heated or to be equipped with a heater in a strict sense. Rather, an appropriate portion or component, such as a thin strip of aluminum foil, can be present in the mold, in particular at the area to be joined. When such a mold with the two-piece confectionery product embedded therein passes through an induction heater, heat is produced only in the mentioned component, not in the confectionery product itself, so that only that part of the confectionery product which is near this component is heated. This is advantageous over other known methods of sealing confections in that the heating is localized and occurs only where the component is placed and only where heat is required for joining the parts. The duration of heating can be easily controlled since the component, particularly when in the form of a foil, has little mass, and thus retains little residual heat when the electromagnetic energy is removed. This provides control over the heating time, minimizes the risk of overheating areas adjacent to the sealing area, prevents de-tempering of the chocolate and avoids melting more of the product than is necessary to create a good seal. Lastly, this method allows the joined pieces to cool relatively quickly so as to expedite extraction from the mold. In particular, the induction heater may have a coil which is energized with a radio frequency electric current. This may generate a high frequency electromagnetic field that acts on either an electrically conductive or a ferromagnetic work piece. In an electrically conductive work piece the heating effect is based on resistive heating which occurs due to magnetically induced currents called eddy currents. In a ferromagnetic work piece, the heating is mainly caused by hysteresis as the magnetic component of the electromagnetic field distorts the crystalline structure of the ferromagnetic material. The above-described effects may be combined with each other. As an example in the field of confectionery, a mold for a two-piece filled praline can be symmetrical about a vertical axis, and an induction heatable component can be present as a ring or circle near the interface between the two pieces. Thus, when the shell has been formed and filled and the lid has been applied, for example by pouring liquid chocolate, the mold with the described confectionery product may be passed through an induction heater, and the area around the interface between the shell and the lid will be heated so that at least the contact surfaces are slightly molten, and the two pieces are welded together. It has been found that the portion or component present in the mold, which is heatable by induction, does not have to be very large. Thus, this portion or component will quickly cool after heating, so that there is no interference with quick cooling and solidification of the confectionery product or its removal from the mold.

Whereas, it is also conceivable to provide and/or apply at least one piece, such as the lid as a solid piece of meltable material, such as chocolate, at least one piece of the confectionery product may be applied in liquid form, e.g. as molten chocolate. As mentioned above, the confectionery product may be formed as a product having a shell and a lid as well as a filling.

There is further described an apparatus for producing a confectionery product in which a heater may be provided downstream from a second piece forming/applying device. Thus, when using the apparatus, after a second piece, portion section or part is formed by pouring molten material or applied by bringing a solid piece in contact with a first piece, the interface between the two pieces can be heated so as to weld the two pieces together and enhance the bonding thereof. The advantageous embodiments of the apparatus substantially correspond to the above-described embodiments of the method described herein and lead to the same advantages.

This also applies to a novel mold, which is preferably used in the apparatus described above, and has at least one portion or component which is heatable by induction heating. The mold may have the general shape of a tray with plural mold cavities, i.e. recesses, in which two-piece (or more) confectionery products are accommodated. In the mold, the area at the interface of the first and the second piece is provided with a component or portion heatable by induction heating. In other words, the portion or component, which is heatable, may advantageously be located at the seam area(s) between the two or more pieces of a confectionery product. The mentioned component can, for example, be formed of a ring-like aluminum strip surrounding the mold cavity at the described interface. Thus, plural confectionery products to be made from two or more pieces can be accommodated in the described tray and can be passed through an induction heater to heat the interface between the first and the second piece, melt the material somewhat and subsequently weld it together to provide a particularly strong bond.

Finally, there is provided a heatable, preferably ferromagnetic component which is present in the vicinity of a confectionery product. As indicated above, such a component may, for example, be heated by induction heating and used to heat one or more interfaces or seam area(s) which may be present in a confectionery product, which has been made from two or more pieces. The mentioned component, which could be a metallic foil, which may be part of a product's wrapping, may, as described above, be used to heat certain portions of the confectionery product and may advantageously form part of the product's wrapping thereafter. In particular, with such a component being present at an appropriate location of a confectionery product, there may be no need for placing the product in a mold when parts thereof are to be heated.

BRIEF DESCRIPTION OF THE DRAWINGS

Hereinafter will be described a non-limiting example with reference to the drawings, in which FIG. 1 schematically shows a mold for forming a confectionery product from two pieces.

DETAILED DESCRIPTION

Figure 1:
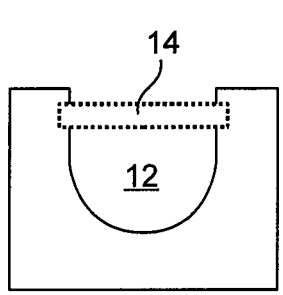

FIG. 1 schematically shows a mold 10 for forming a confectionery product having a mold cavity 12 which substantially corresponds to the desired final shape of the confectionery product, such as a praline, and has in the depicted embodiment, a substantially "inverted dome" shape. It is noted that the praline is, in the embodiment shown, produced "upside down". Thus, the final praline will substantially have a dome-shape with a cylindrical lower part and a hemispheric upper part. As can be seen in FIG. 1, a component 14 which is heatable by induction heating is provided in the upper part of the mold cavity in the embodiment shown. The component 14 can, for example, be a ring-shaped aluminum strip. It is also noted that FIG. 1 shows a single mold, but plural molds or mold cavities 12 may be formed in a tray which is adapted to allow the production of plural confectionery products.

Figure 2:
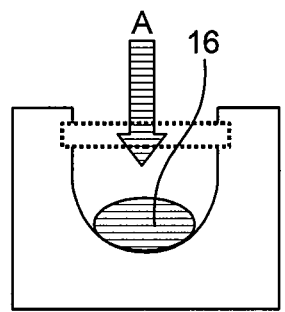
FIG. 2 schematically shows the mold as the chocolate has been filled into the mold.

As shown in FIG. 2, the process of producing a confectionery product from two pieces may start by pouring an appropriate amount of meltable material, such as chocolate 16 into the mold, substantially in the direction of arrow A.

Figure 3:
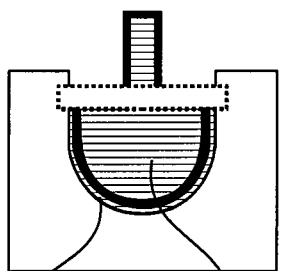
FIG. 3 schematically shows the mold during the forming of the chocolate shell.
Figure 4:
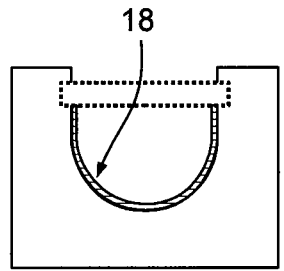
FIG. 4 schematically shows the mold accommodating the chocolate shell.

As shown in FIG. 3, a shell 18 is subsequently formed in the mold cavity, in the embodiment shown by a plunger 20 which defines, in cooperation with the mold, a dome-shaped space, in which the shell 18 is formed. The plunger may be cold and can, consequently, contribute to the cooling of the shell. After cooling the plunger, which can also be called a stamp, is removed. FIG. 4 shows the hollow shell 18 which remains in the mold 10.

Figure 5:
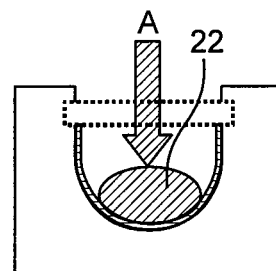
FIG. 5 schematically shows the step of filling the shell.

As shown in FIG. 5, the shell can, thereafter, be filled with an appropriate filling 22 which can be poured substantially in the direction of arrow A.

Figure 6:
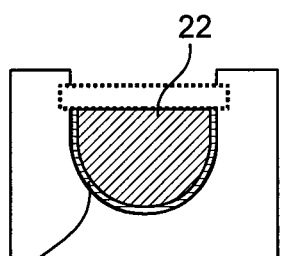
FIG. 6 schematically shows the filled shell.

FIG. 6 shows the shell 18 substantially completely filled with the filling 22.

Figure 7:
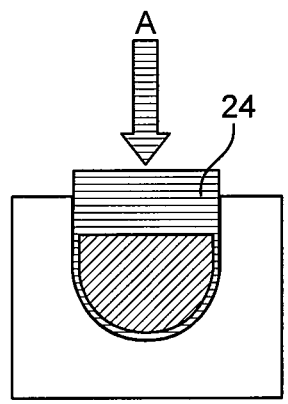
FIG. 7. schematically shows the filled shell covered with a lid.

FIG. 7 shows the application of a lid 24, again substantially in the direction of arrow A. The lid can be applied as a solid piece of chocolate, which can, in the embodiment shown, be substantially circular. However, the lid 24 may also be formed by pouring molten chocolate. Especially in the latter case, the lid can originally be too thick so that there can be the need to remove, in particular scrape, material from the lid.

Figure 8:
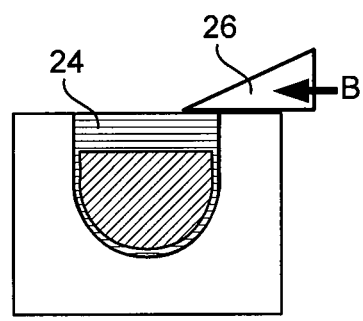
FIG. 8 schematically shows the step of modifying the lid.

This is shown in FIG. 8 where a type of blade 24 is moved substantially in the direction of arrow B, i.e. across the opening of the mold, so as to cut the lid 24 to the desired thickness. As detailed above, the bonding between the shell and the lid is often unsatisfactory using the prior art techniques.

Figure 9:
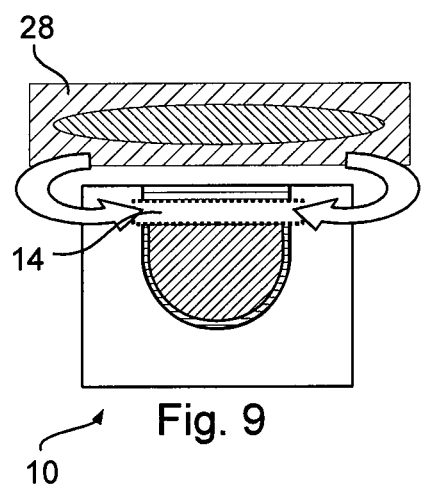
FIG. 9 schematically shows the step of heating the interface between the shell and the lid.
Figure 10:
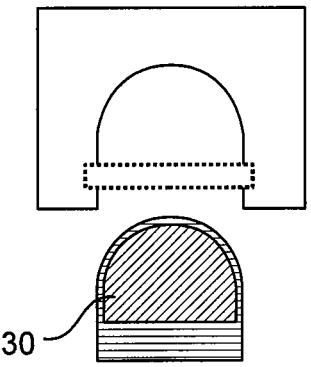
FIG. 10 schematically shows the step of de-molding the confectionery product.

Therefore, as indicated in FIG. 9, the mold may be passed through an induction heater 28 adapted to heat the component 14 for a sufficient time so that this component will become warm and will heat the interface between the shell 18 and the lid 24. Thus, the chocolate material in that area will melt to some extent. After leaving the induction heater 28, the confectionery product 30 (see FIG. 10) may be allowed to cool and the shell and lid may be welded together particularly strong at their interface so as to provide improved bonding in that area. After cooling, the confectionery product 30 will be demolded as shown in FIG. 10, for example by turning the mold upside down.

Figure 11:
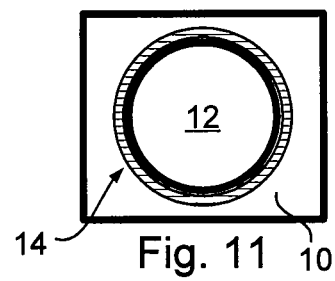
FIG. 11 schematically shows a top view of the mold.

As shown in FIG. 11, the component 14 may be a ring-shaped strip of suitable material, such as aluminum, or any other induction heatable material, and may be a few millimeters, e.g. 3 to 5 mm wide, the width extending perpendicular to the plane of the drawing of FIG. 11 and embedded all around the mold cavity 12.

EXAMPLE

Dome-shaped pralines were prepared using a cocoa-butter based composition consisting of 40% cocoa butter, 53% Lactose and 7% milk protein. The shells were prepared by stamping the composition into a mold by a plunger resulting in a wall thickness of 1.4 mm. The praline shells were filled with a gelatin preparation consisting of 56.1% water, 37.4% fructose, 5.6% gelatin powder and 0.9% potassium sorbate. The filled shells were warmed for 5 secs using an infrared heater and then sealed by depositing more of the cocoa-butter based composition over the gelatin and smoothing to spread the composition to the edges of the praline. The thickness of the bottom layer was approximately 3 mm. When complete, the pralines had a bottom diameter of 27 mm and a height of approximately 24.5 mm.

The pralines were prepared for induction heating and sealing as follows: Strips of aluminum foil were prepared having a height of 5 mm and a length of 90 mm. Each strip was made from a double layer of 0.02 mm thick aluminum foil. A strip of foil was wrapped circumferentially around the bottom of the praline, and was held in place by placing the pralines, inverted, into the plastic mold originally used to form the shells. The tight fit of the praline within its mold ensured that the aluminum foil strip was in good contact with the bottom of the praline. This approach was designed to simulate the behaviour to be expected from a plastic mold having a metal strip permanently embedded in or slightly below the food contact surface. Four aluminum foil wrapped pralines were placed in the corners of a 1 mm thick, 8 cavity plastic mold, having length×width dimensions of 16 cm×8 cm.

Aluminum foil wrapped pralines, in their mold (as described above) were sealed on induction sealing equipment normally used for sealing jars (Unifoiler U6P400200000, Part# CB10461-3, Pillar Technologies, Hartland, Wis., USA). The plastic mold was conveyed under the induction sealing head, using a conveyor belt which was adjusted to provide a 10 second residence time under the induction sealing head. The plastic mold was supported on top of an empty plastic jar leaving a gap of approximately 5 mm between the plastic mold and the induction sealing head. The induction sealer was operated at a 20% power level (Maximum Power: 6000 Watts).

Evidence of melting of the cocoa butter around the perimeter of the seal area was evident after the mold emerged from the induction sealing head. The pralines were kept in their molds for 18 hours at room temperature to fully solidify before removal. After the pralines were removed from the mold, the aluminum foil strip was peeled off the pralines and they were then subjected to mechanical testing as described below.

Compression testing of the pralines was conducted using a TAXT-2 texture analyzer (Surrey, England), equipped with a flat plate compression fitment. A single compression test was made using a platen speed of 0.5 mm/sec until a 10% strain (deformation) was experienced. The peak force was recorded as a measure of the strength to failure. Measurements were made of control (untreated) pralines, ones that were induction sealed and samples which had their bottoms removed (using a razor blade).

Average Force to Failure

Control (average of 2 samples)=1856 g

Control Without Bottoms (average of 3 samples)=1568 g

Induction Sealed (average of 4 samples)=2204 g

Comparing the strength of the 'Control Without Bottoms' to 'Control' shows the importance of the bond between the sides of the praline and its bottom in maintaining the overall strength of the praline. The additional fusion afforded by the induction sealing treatment strengthened the bond between the bottom and the sides, resulting in approximately a 19% improvement in strength over the control.

What is claimed is:

1. A method for producing a confectionery product from at least two pieces with an interface between the two pieces, the method comprising:
    pouring a meltable confectionery material into a mold cavity, the mold cavity having a ring-shaped strip capable of being heated by an induction sealing head of an induction sealing machine, the ring-shaped strip being separate from the induction sealing head;
    forming a first confectionery piece in the mold cavity from the meltable confectionery material;
    applying a second confectionery piece to the first confectionery piece, either as a solid confectionery material or as a molten confectionery material forming an interface therebetween, the pieces comprising meltable confectionery material at least in parts of the interface; and
    localized inductive heating of the interface by the induction sealing head while the confectionery pieces are in the mold cavity by localized induction heating the ring-shaped strip in the mold cavity during the time or after the time at which the at least two pieces are brought into contact with each other.

2. The method of claim 1, wherein the confectionery product is removed from the mold cavity having the ring-shaped strip after the localized heating of the interface by induction heating.

3. The method of claim 1, wherein at least one of the first or second piece is formed by applying the meltable confectionery material in liquid form.

4. The method of claim 1, wherein the two pieces are a shell and a lid, and the shell is filled with a filling before applying the lid.

5. The method of claim 1, wherein the meltable confectionery material is chocolate.

6. The method of claim 1 wherein the ring-shaped strip is made of aluminum.

7. The method of claim 1 wherein the induction heating is performed by a ferromagnetic component.

8. The method of claim 1 wherein heating the interface comprises heating of a heatable component to heat the interface at a temperature and for a time effective to melt surfaces of the pieces which abut each other at the interface.

9. The method of claim 8 further comprising holding the surfaces in a molten state for a period of time sufficient to allow the molten regions to merge, then afterward cooling them, resulting in the formation of a strong bond when they are cooled afterward.

10. The method of claim 9 wherein the heating is performed by induction heating through a strip of material.

11. The method of claim 1 wherein the first confectionery piece is formed by application of a cooling plunger, where the cooling plunger is used to cool the first piece upon formation.

12. The method of claim 1 further comprising cutting the second piece to a desired thickness after it is applied to the first piece.

\* \* \* \* \*